(12) United States Patent
Shin et al.

(10) Patent No.: US 12,348,609 B2
(45) Date of Patent: Jul. 1, 2025

(54) APPARATUS FOR PROCESSING HOMOMORPHIC ENCRYPTED MESSAGES AND METHOD THEREOF

(71) Applicant: CRYPTO LAB INC., Seoul (KR)

(72) Inventors: Junbum Shin, Seoul (KR); Younggi Lee, Seoul (KR)

(73) Assignee: CRYPTO LAB INC., Seoul (KR)

( * ) Notice: Subject to any disclaimer, the term of this patent is extended or adjusted under 35 U.S.C. 154(b) by 200 days.

(21) Appl. No.: 18/331,892

(22) Filed: Jun. 8, 2023

(65) Prior Publication Data
US 2023/0421352 A1    Dec. 28, 2023

(30) Foreign Application Priority Data
Jun. 23, 2022    (KR) .................... 10-2022-0076578

(51) Int. Cl.
*H04L 9/00* (2022.01)
*G06F 7/483* (2006.01)
*G06F 7/556* (2006.01)
*H04L 9/30* (2006.01)

(52) U.S. Cl.
CPC .................... *H04L 9/008* (2013.01)

(58) Field of Classification Search
CPC ....... H04L 9/008; H04L 9/3093; G06F 7/483; G06F 7/556
See application file for complete search history.

(56) References Cited

U.S. PATENT DOCUMENTS

2023/0325150 A1*  10/2023  Ren .................... G06F 7/483
                                                              708/205

FOREIGN PATENT DOCUMENTS

JP    2018074448 A    5/2018

OTHER PUBLICATIONS

Viola et al. (Viola) Homomorphic-Encrypted Volume Rendering, published Feb. 2021. (Year: 2021).*
Homomorphic Encryption for Arithmetic of Approximate Numbers, by Kim et al., published 2017. (Year: 2017).*
Homomorphic-Encrypted Volume Rendering, published 2021, by Patel et al. (Year: 2021).*
Mazza, S. et al., "Homomorphic-Encrypted Volume Rendering" IEEE Transactions on Visualization and Computer Graphics, vol. 27, No. 2. Feb. 2021. 10 pages.
Office Action issued for Korean Patent Application No. 10-2022-0076578 filed on Jun. 23, 2022 on behalf of Crypto Lab Inc. Issuance date: Sep. 13, 2024. 12 pages.

* cited by examiner

*Primary Examiner* — Vu V Tran
(74) *Attorney, Agent, or Firm* — Steinfl + Bruno LLP

(57)    ABSTRACT

Disclosed is a method of processing an encrypted message. The method of processing an encrypted message includes checking exponential data and mantissa data for numerical data, performing homomorphic encryption on the mantissa data, and merging the encrypted mantissa data and the exponential data to generate a homomorphic encrypted message.

12 Claims, 12 Drawing Sheets

APPARATUS FOR PROCESSING HOMOMORPHIC ENCRYPTED MESSAGES AND METHOD THEREOF

CROSS-REFERENCE TO RELATED APPLICATION(S)

This application claims priority to Korean patent application number 10-2022-0076578, filed on Jun. 23, 2022, in the Korean Intellectual Property Office, the disclosure of which is incorporated by reference herein in its entirety.

BACKGROUND

Field

Apparatuses and methods consistent with the disclosure relate to an apparatus and method of performing a calculation on a homomorphic encrypted message, and more particularly, to an apparatus and method capable of storing numerical data as a floating-point type homomorphic encrypted message.

Description of the Related Art

As communication technology develops and electronic devices spread, efforts are continuously made to maintain communication security between the electronic devices. Accordingly, encryption/decryption technology is used in most communication environments.

When messages encrypted by the encryption technology are delivered to the other party, the other party needs to perform decryption in order to use the messages. In this case, the other party wastes resources and time in the process of decrypting the encrypted data. In addition, when the third party hacks messages while the other party temporarily decrypts the messages for calculation, there is a problem in that the messages may be easily leaked to the third party.

In order to solve this problem, a homomorphic encryption method is being studied. According to the homomorphic encryption, even if calculation is performed on encrypted messages themselves without decrypting the encrypted information, it is possible to obtain the same result as the encrypted value after calculation on a plain text. Accordingly, various types of calculations may be performed without decrypting the encrypted messages.

Meanwhile, numerical data in the existing homomorphic encrypted messages was encrypted with a numerical value as it is. That is, data in the existing homomorphic encrypted message was processed in a fixed-point method. However, when a data range between a plurality of homomorphic encrypted messages is very wide, there is a problem in that it is difficult to simultaneously manage relatively large or small data.

SUMMARY

The disclosure provides an apparatus and method capable of performing calculation by storing numerical data as a homomorphic encrypted message in a floating-point type.

According to one or more embodiments of the disclosure, a method of processing an encrypted message in an arithmetic unit includes: checking exponential data and mantissa data for numerical data; performing homomorphic encryption on the mantissa data; and merging the encrypted mantissa data and the exponential data to generate a homomorphic encrypted message.

In the checking, an exponential value and a mantissa value of the numerical data may be calculated based on a predetermined exponential value, and in the performing of the homomorphic encryption, the mantissa value may be homomorphically encrypted.

The method may further include performing homomorphic encryption on the exponential data, in which, in the generating of the homomorphic encrypted message, the homomorphic encrypted message may be generated by merging the encrypted mantissa data and the encrypted exponential data.

In the generating of the homomorphic encrypted message, the homomorphic encrypted message may be generated by arranging the encrypted mantissa data in a real area of the homomorphic encrypted message and arranging the encrypted exponential data in an imaginary area of the homomorphic encrypted message.

The method may further include generating a homomorphic encrypted message in a fixed-point data type using the encrypted mantissa data and exponential data in the homomorphic encrypted message.

The method may further include generating a second homomorphic encrypted message having the same plain text numerical value as the homomorphic encrypted message and having an exponent of a different value.

The method may further include performing calculation between a plurality of homomorphic encrypted messages, in which, in the performing of the calculation, an exponential value of at least one of the plurality of homomorphic encrypted messages may be scaled so that the plurality of homomorphic encrypted messages have the same exponential value, and calculation is performed between the homomorphic encrypted messages having the same exponential value.

According to one or more embodiments of the disclosure, an arithmetic unit includes a memory configured to store numerical data, a processor configured to generate a homomorphic encrypted message for the numerical data, in which the processor checks exponential data and mantissa data for numerical data, homomorphically encrypts the checked mantissa data, and merges the encrypted mantissa data and the exponential data to generate the homomorphic encrypted message.

The processor may calculate the exponent value and mantissa value of the numerical data based on a predetermined exponent value, and may homomorphically encrypt the mantissa value.

The processor may homomorphically encrypt the exponential data and merge the encrypted mantissa data and the encrypted exponential data to generate a homomorphic encrypted.

The processor may arrange the encrypted mantissa data in a real area of the homomorphic encrypted message and arrange the encrypted exponential data in an imaginary area of the homomorphic encrypted message to generate the homomorphic encrypted message.

The processor may generate a homomorphic encrypted message in a fixed-point data type using the encrypted mantissa data and exponential data in the homomorphic encrypted message.

The processor may generate a second homomorphic encrypted message having the same plain text numerical value as the homomorphic encrypted message and having an exponent of a different value.

When a calculation command between a plurality of homomorphic encrypted messages is requested, the processor may scale an exponential value of at least one of the plurality of homomorphic encrypted messages so that the plurality of homomorphic encrypted messages have the same exponential value, and perform calculation between the homomorphic encrypted messages having the same exponential value.

Therefore, the disclosure is devised to solve the above-described problem, and since a homomorphic encrypted message is stored in a floating point method, it is possible to prevent variation in precision during a calculation process.

BRIEF DESCRIPTION OF THE DRAWINGS

The above and/or other aspects of the disclosure will be more apparent by describing certain embodiments of the disclosure with reference to the accompanying drawings, in which.

DETAILED DESCRIPTION

Figure 1:
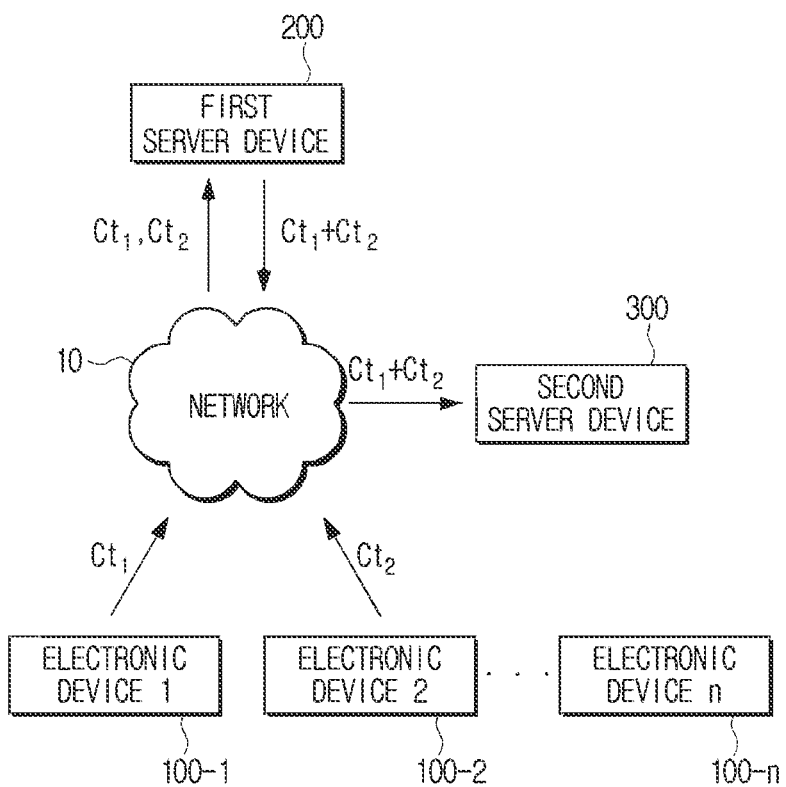
FIG. 1 is a diagram for describing a structure of a network system according to one or more embodiments of the disclosure.

Hereinafter, the disclosure will be described in detail with reference to the accompanying drawings. Encryption/decryption may be applied to an information (data) transmission process performed in the disclosure, if necessary, and all expressions describing the information (data) transmission process in the disclosure and claims should be interpreted as including cases of encryption/decryption even if not separately stated. In the disclosure, expressions such as "transmission (delivery) from A to B" or "A receiving from B" include transmission (delivery) or reception with another medium included therebetween, and does not necessarily express only what is directly transmitted (delivered) or received from A to B.

In the description of the disclosure, the order of each step should be understood as non-limiting unless the preceding step needs to be logically and temporally performed necessarily before the following step. In other words, except for the above exceptional cases, even if the process described as the following step is performed before the process described as the preceding step, the nature of the disclosure is not affected, and the scope should also be defined regardless of the order of the steps. In this specification, "A or B" is defined to mean not only selectively indicating either one of A and B, but also including both A and B. In addition, in the disclosure, the term "include" has a meaning encompassing further including other components in addition to elements listed as included.

In this disclosure, only essential components necessary for the description of the disclosure are described, and components unrelated to the essence of the disclosure are not mentioned. In addition, it should not be interpreted as an exclusive meaning that includes only the mentioned components, but should be interpreted as a non-exclusive meaning that may include other components.

In addition, in the disclosure, "value" is defined as a concept including a vector as well as a scalar value. In the disclosure, the expressions such as "compute," and "calculate" may be replaced by an expression that produces a result of the corresponding computation or calculation. In addition, by processing a homomorphic encrypted message, expressions such as 'processing' or 'changing' the homomorphic encrypted message may be replaced with an expression of generating a homomorphic encrypted message corresponding to the processing result.

In addition, unless otherwise stated, calculation of an encrypted message to be described below means a homomorphic operation. For example, addition to the homomorphic encrypted message refers to homomorphic addition to two homomorphic encrypted messages.

Mathematical calculation and computations of each step of the disclosure to be described below may be implemented as computer operations by the known coding method and/or coding designed to suit the disclosure.

Specific equations to be described below are illustratively described among possible alternatives, and the scope of the disclosure should not be construed as being limited to equations mentioned in the disclosure.

For convenience of description, in the disclosure, a notation is defined as follows.

a←D: select element (a) according to distribution (D)

s1, s2∈R: S1, S2: Each of S1 and S2 is an element belonging to set R.

mod(q): Modular calculation with element q

⌊•⌉: Round-off internal value

Hereinafter, various embodiments of the disclosure will be described in detail with reference to the accompanying drawings.

FIG. 1 is a diagram for describing a structure of a network system according to one or more embodiments of the disclosure.

Referring to FIG. 1, a network system may include a plurality of electronic devices 100-1 to 100-$n$, a first server device 200, and a second server device 300, each of which may be connected to each other through a network 10.

The network 10 may be implemented in various types of wired and wireless communication networks, broadcast communication networks, optical communication networks, cloud networks, etc., and each device may be connected in a manner such as Wi-Fi, Bluetooth, near field communication (NFC), etc., without a separate medium.

Although FIG. 1 illustrates a plurality of electronic devices 100-1 to 100-n, a plurality of electronic devices are not necessarily used, and one device may be used. For example, the electronic devices 100-1 to 100-n may be implemented as various types of devices such as smart phones, tablets, game players, PCs, laptop PCs, home servers, and kiosks. In addition, the electronic devices 100-1 to 100-n may be implemented in the form of home appliances to which an IoT function is applied.

Users may input various types of information through the electronic devices 100-1 to 100-n they use. The input information may be stored in the electronic devices 100-1 to 100-n themselves, but may also be transmitted to and stored in an external device for storage capacity and security reasons. In FIG. 1, the first server device 200 may serve to store such information, and the second server device 300 may serve to use some or all of the information stored in the first server device 200.

Each of the electronic devices 100-1 to 100-n may homomorphically encrypt the input information and transmit the homomorphic encrypted messages to the first server device 200.

Each of the electronic devices 100-1 to 100-n may include encryption noise, i.e., an error, generated in the process of performing homomorphic encryption in an encrypted message. Specifically, the homomorphic encrypted messages generated by each of the electronic devices 100-1 to 100-n may be generated in a form in which a result value including a message and an error value is restored when decrypted later using a secret key.

For example, when the homomorphic encrypted messages generated by the electronic devices 100-1 to 100-n are decrypted using a secret key, the homomorphic encrypted messages may be generated in a form that satisfies the following natures.

$$Dec(ct, sk) = <ct, sk> = M + e \pmod{q} \qquad \text{[Equation 1]}$$

Here, $<,>$ denotes a dot product calculation (usual inner product), ct denotes an encrypted message, sk denotes a secret key, M denotes a plain text message, e denotes an encryption error value, and mod q denotes a modulus of an encrypted message. q should be selected to be greater than a result value M obtained by multiplying a scaling factor $\Delta$ by a message. When an absolute value of the error value e is sufficiently small compared to M, a decryption value M+e of the encrypted message is a value that may replace the original message with the same precision in significant figure calculation. Among the decoded data, an error may be arranged on the least significant bit (LSB) side, and M may be arranged on the next least significant bit side.

When a size of the message is too small or too large, the size may be adjusted using a scaling factor. When the scaling factor is used, not only an integer type message but also a real number type message may be encrypted, and thus, the usability of the message may be greatly increased. In addition, by adjusting the size of the message using the scaling factor, a size of an area where messages exist in the encrypted message after the calculation is made, that is, a size of an effective area may also be adjusted.

Depending on the embodiment, a modulus q of the encrypted message may be set and used in various forms. For example, the modulus of the encrypted message may be set in the form of an exponential power $q = \Delta^L$ of the scaling factor $\Delta$. When $\Delta$ is 2, A may be set to a value such as $q = 2^{10}$.

In addition, the homomorphic encrypted message according to the disclosure assumes that data is stored in a floating point method of numerical data, but may be applied even when a fixed point is used.

The first server device 200 may store the received homomorphic encrypted message in an encrypted message state without decrypting received homomorphic encrypted message.

The second server device 300 may request a specific processing result for the homomorphic encrypted message from the first server device 200. The first server device 200 may perform a specific calculation according to the request of the second server device 300 and then transmit the result to the second server device 300.

For example, when encrypted messages ct1 and ct2 transmitted by the two electronic devices 100-1 and 100-2 are stored in the first server device 200, the second server device 300 may request, from the first server device 200, a value obtained by summing information provided from the two electronic devices 100-1 and 100-2. The first server device 200 may perform calculation for summing the two encrypted messages according to the request, and then transmit the result value ct1+ct2 to the second server device 300. In this case, the server device 200 may perform basic four arithmetic operations such as addition/subtraction, statistical calculation, or the like. In addition, in order to facilitate explanation below, it is assumed that each homomorphic encrypted message is stored in a floating-point type, which will be described later, but it is also possible to perform calculations between homomorphic encrypted messages stored in fixed-point type and homomorphic encrypted messages stored in a floating-point type. Various calculation types will be described below in FIG. 4 or later.

Due to the nature of the homomorphic encrypted message, the first server device 200 may perform the calculation without the decryption, and the result value is also in the form of an encrypted message. In the disclosure, the result value obtained by calculation is referred to as a calculation result encrypted message.

The first server device 200 may transmit the calculation result encrypted message to the second server device 300. The second server device 300 may decrypt the received calculation result encrypted message and acquire calculation result values of data included in each homomorphic encrypted message.

The first server device 200 may perform the calculation several times according to a user request. In this case, proportions of approximate messages within the calculation result encrypted messages obtained for each calculation are different. The first server device 200 may perform a bootstrapping operation when the proportions of the approximate messages exceed a threshold value. In this way, the first server device 200 may be referred to as an arithmetic unit in that it may perform the calculation operation.

Figure 2:
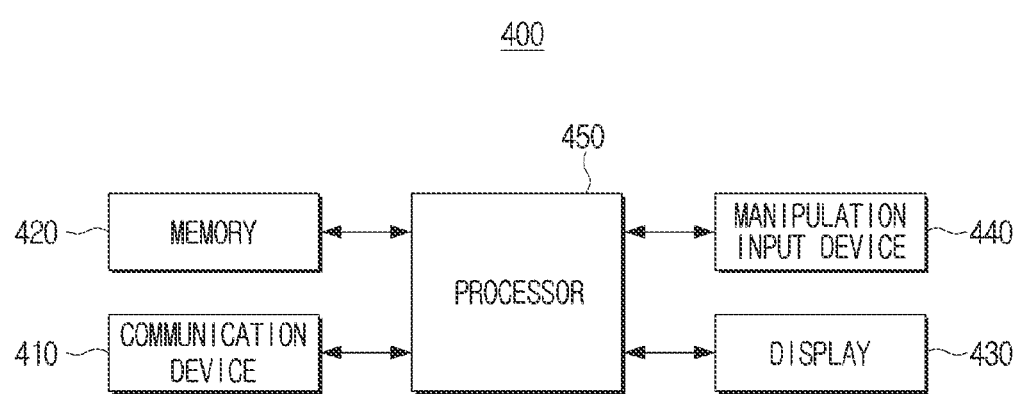
FIG. 2 is a block diagram illustrating a configuration of an arithmetic unit according to one or more embodiments of the disclosure.

Meanwhile, FIG. 1 illustrates a case where the first electronic device and the second electronic device perform the encryption and the second server device performs the decryption, but is not necessarily limited thereto. FIG. 2 is a block diagram illustrating a configuration of an arithmetic unit according to one or more embodiments of the disclosure.

Specifically, in the system of FIG. 1, a device that performs homomorphic encryption, such as the first electronic device and the second electronic device, a device that calculates the homomorphic encrypted message, such as the first server device, and a device that decrypts the homomorphic encrypted message, such as a second server device, may be referred to as an arithmetic unit. The arithmetic unit may be various devices such as a personal computer (PC), a laptop computer, a smart phone, a tablet, and a server.

Referring to FIG. 2, an arithmetic unit 400 may include a communication device 410, a memory 420, a display 430, a manipulation input device 440, and a processor 450.

The communication device 410 is formed to connect the arithmetic unit 400 to an external device (not illustrated), and may be connected to the external device through a local area network (LAN) and the Internet network or be connected to the terminal apparatus through a USB port or a wireless communication (for example, wireless fidelity (WiFi), 802.11a/b/g/n, near field communication (NFC), or Bluetooth) port. Such a communication device 410 may also be referred to as a transceiver.

The communication device 410 may receive a public key from the external device and transmit the public key generated by the arithmetic unit 400 itself to the external device.

Also, the communication device 410 may receive a message from the external device and transmit the generated homomorphic encrypted message to the external device.

Also, the communication device 410 may receive various parameters required for generating an encrypted message from an external device. Meanwhile, upon implementation, various parameters may be directly received from a user through a manipulation input device 440 to be described later.

In addition, the communication device 410 may receive a request for calculation of the homomorphic encrypted message from an external device and transmit the calculated result to the external device.

The memory 420 is a component for storing O/S for driving the arithmetic unit 400, various software, data, and the like. The memory 420 may be implemented in various forms such as RAM, ROM, flash memory, HDD, external memory, and memory card, but is not limited to any one.

The memory 420 stores a message to be encrypted. Here, the message may be various types of credit information, personal information, numerical data, and the like cited by a user, and may also be information related to location information used in the arithmetic unit 400 and a use history such as Internet usage time information.

In addition, the memory 420 may store a public key, and when the arithmetic unit 400 is a device that directly generates the public key, the memory 420 may store not only a secret key, but also various parameters necessary for generating the public key and the secret key.

Also, the memory 420 may store the homomorphic encrypted message generated in the process described below. Also, the memory 420 may store the homomorphic encrypted message transmitted from the external device. Also, the memory 420 may store the calculation result encrypted message that is the result of the calculation process described later.

The display 430 displays a user interface window for selecting a function supported by the arithmetic unit 400. Specifically, the display 430 may display a user interface window for selecting various functions provided by the arithmetic unit 400. The display 430 may be a monitor such as a liquid crystal display (LCD) and organic light emitting diodes (OLED), and may be implemented as a touch screen capable of simultaneously performing the functions of the manipulation input device 440 to be described later.

The display 430 may display a message requesting input of parameters necessary for generating a secret key and a public key. Also, the display 430 may display a message in which an encryption target selects a message. Meanwhile, in implementation, the encryption target may be directly selected by a user or may be automatically selected. That is, personal information or the like that requires encryption may be automatically set even if a user does not directly select a message.

The manipulation input device 440 may receive a function selection of the arithmetic unit 400 and a control command for the function from the user. Specifically, the manipulation input device 440 may receive parameters necessary for generating a secret key and a public key from the user. Also, the manipulation input device 440 may receive a message to be encrypted from a user.

The processor 450 controls each component in the arithmetic unit 400. The processor 450 may be composed of a single device such as a central processing unit (CPU) and an application-specific integrated circuit (ASIC), or may be composed of a plurality of devices such as a CPU and a graphics processing unit (GPU).

When a message to be transmitted is input, the processor 450 stores the message in the memory 420. The processor 450 uses various setting values and programs stored in the memory 420 to homomorphically encrypt the message. In this case, a public key may be used.

The processor 450 may generate and use a public key required to perform encryption by itself, or may receive and use the public key from an external device. For example, the second server device 300 that performs the decryption may distribute a public key to other devices.

When generating a key by itself, the processor 450 may generate a public key using a Ring-LWE technique. Specifically, the processor 450 may first set various parameters and rings and store the parameters and rings in the memory 420. Examples of the parameters may include lengths of plain text message bits, sizes of public and secret keys, and the like.

The ring may be represented by the following equation.

$$R = \frac{Z_q[X]}{f(x)} \qquad \text{[Equation 2]}$$

Here, R denotes a ring, Zq denotes a coefficient, and f(x) denotes an n-th polynomial.

The ring is a set of polynomials having predetermined coefficients, and means a set in which addition and multiplication are defined between elements and which is closed for addition and multiplication. Such a ring may be referred to as an annulus.

For example, the ring means a set of n-th polynomials having a coefficient Zq. Specifically, when n is Φ (N), it means an N-th cyclotomic polynomial. f(x) denotes ideal of Zq[x] generated by the f(x). The Euler totient function Φ(N) means the number of natural numbers that is coprime to N and smaller than N. When $\Phi_N(x)$ is defined as an N-th cyclotomic polynomial, the ring may also be represented by Equation 3 as follows.

$$R = \frac{Z_q[X]}{\Phi_N(x)} \qquad \text{[Equation 3]}$$

A secret key sk may be represented as follows.

Meanwhile, the ring of Equation 3 described above has a complex number in the plain text space. Meanwhile, in order to improve the calculation speed of the homomorphic encrypted message, only a set in which the plain text space is a real number in the above-described set of rings may be used. Alternatively, as will be described later, in case of numerical data, it is also possible for a real number to have values for mantissa data corresponding to a mantissa area and an imaginary number to have values for exponential data corresponding to an exponential area.

When such a ring is established, the processor 450 may calculate the secret key sk from the ring.

$$sk \leftarrow (1, s(x)), s(x) \in R \qquad \text{[Equation 4]}$$

Here, s(x) means a polynomial generated randomly with small coefficients.

The processor 450 calculates a first random polynomial a(x) from the ring. The first random polynomial may be represented as follows.

$$a(x) \leftarrow R \qquad \text{[Equation 5]}$$

Also, the processor 450 may calculate an error. Specifically, the processor 450 may extract an error from a discrete Gaussian distribution or a distribution statistically close to the discrete Gaussian distribution. This error may be represented as follows.

$$e(x) \leftarrow D\textit{n}\alpha q \qquad \text{[Equation 6]}$$

When an error is calculated, the processor 450 may calculate a second random polynomial by modularly calculating an error in the first random polynomial and the secret key. The second random polynomial may be represented as follows.

$$b(x) = -a(x)s(x) + e(x) (\text{mod } q) \qquad \text{[Equation 7]}$$

Finally, a public key pk is set as follows in a form including the first random polynomial and the second random polynomial.

$$pk = (b(x), a(x)) \qquad \text{[Equation 8]}$$

Since the above-described key generation method is only an example, it is not necessarily limited thereto, and it goes without saying that the public key and the private key may be generated by other methods.

Meanwhile, when a public key is generated, the processor 450 may control the communication device 410 to transmit the public key to other devices.

The processor 450 may generate a homomorphic encrypted message for a message. Specifically, the processor 450 may generate a homomorphic encrypted message by applying the previously generated public key to the message. In this case, the processor 450 may generate the length of the encrypted message to correspond to the size of the scaling factor.

When encrypting numerical data, the processor 450 may determine whether to encrypt numerical data in a floating-point data type or a fixed-point data type. For example, the processor 450 may determine to encrypt data in a floating-point data type when calculations such as multiplication are required for data requiring high precision or an encrypted message. Conversely, when relatively low precision is required or if many addition calculations are required for an encrypted message, the processor 450 may determine to perform encryption in the fixed-point data type. In addition to the above-described case, the method of storing the numerical data may be determined in various ways, and may be determined by a user's selection.

When it is determined to process the encryption in the fixed-point data type, the processor 450 may generate the homomorphic encrypted message by applying the public key to the numerical data. In this case, the processor 450 may generate the encrypted message by including information indicating that the stored data is fixed-point type numerical data.

Meanwhile, when it is determined to encrypt the numerical data in the floating-point type, the processor 450 may first check the exponent (part indicating the fixed-point part) and mantissa (part indicating a fixed-point position) of the numerical data. For example, when there is numerical data of 527.3, the processor 450 may check that a mantissa value is 5.273 and an exponential value is 2.

In this case, the processor 450 may generate the exponential value and the mantissa value in consideration of a predetermined exponent without generating the mantissa value and the exponential value so that a first digit of the mantissa value has a value of 1 to 9 as described above.

For example, when the predetermined exponential value is set to 1 (i.e., 10), the processor 450 may set the mantissa value to be 52.7 and the exponential value to be 1 in a numerical value of 527.3. In this way, when the exponential area and the mantissa area are distinguished by reflecting the predetermined exponential value, even if the exponential value corresponding to the exponential area is not encrypted, it is possible to prevent the size of the value from being directly exposed through the exposure of the corresponding value. Here, as the predetermined exponential value, when a plurality of data exists, an exponential value of data having an intermediate size may be used. Meanwhile, as such a predetermined value, various values such as the most exponential values, a specific value set by a user, or a random value as well as a medium size may be used.

When the exponential value and the mantissa value are determined, the processor 450 may generate a homomorphic encrypted message by performing the homomorphic encryption on the mantissa value and merging the encrypted mantissa data and the exponential data. In this case, the processor 450 may generate the homomorphic encrypted message by including information indicating that the data is the numerical data in the fixed-point type.

Meanwhile, in the above description, only the mantissa data is encrypted, but in implementation, it is also possible to encrypt the exponential data. In addition, since the homomorphic encrypted message has a complex number form, the homomorphic encrypted message may be generated by arranging the encrypted mantissa data in the real area among the complex number areas in the homomorphic encrypted message and arranging the unencrypted exponential data in the imaginary area.

In addition, when the encryption is applied to the exponential data, the homomorphic encrypted message may be generated by arranging the encrypted mantissa data in the real area within the homomorphic encrypted message and arranging the encrypted exponential data in the imaginary area. In the above description, it has been described that the mantissa data is arranged in the real area and the exponential data is arranged in the imaginary area, but locations of two data may be reversed during implementation. That is, the mantissa data may be located in the imaginary area, and the exponential data may be located in the real area.

When the homomorphic encrypted message is generated, the processor 450 may control the communication device 410 to store the homomorphic encrypted message in the memory 420 or transmit the homomorphic encrypted message to another device according to a user request or a predetermined default command.

Meanwhile, according to one or more embodiments of the disclosure, packing may be performed. When the packing is used in homomorphic encryption, it becomes possible to encrypt a plurality of messages into one encrypted message. In this case, one encrypted message may be expressed as having a plurality of slots, and the encrypted message for one numerical data may be stored in each slot described above. In this case, when the arithmetic unit 400 performs calculations between each encrypted message, since calculations for multiple messages are processed in parallel, the calculation burden is greatly reduced.

Specifically, when a message is composed of a plurality of message vectors, the processor 450 may transform a plurality of message vectors into a polynomial in a form that the plurality of message vectors may be encrypted in parallel, multiply the polynomial by a scaling factor, and perform the homomorphic encryption using a public key. Accordingly, an encrypted message in which a plurality of message vectors are packed may be generated.

Further, when the homomorphic encrypted message needs to be decrypted, the processor 450 may apply a secret key to the homomorphic encrypted message to generate a polynomial-type decrypted message, and decode the polynomial-type decrypted message to generate a message. In this case, the generated message may include an error as mentioned in Equation 1 described above.

The processor 450 may perform calculation on the encrypted message. Specifically, the processor 450 may perform calculations such as addition or multiplication on the homomorphic encrypted message while maintaining an encrypted state. Also, the processor 450 may perform various statistical calculations as well as the four arithmetic operations as described above.

Further, the processor 450 may generate a fixed-point type homomorphic encrypted message for a homomorphic encrypted message stored in a floating-point type. Also, the processor 450 may generate a homomorphic encrypted message in which the position of the floating point varies. That is, the processor 450 may generate a homomorphic encrypted message having the same numerical value as the existing homomorphic encrypted message, and having exponential data and mantissa data of different values. For example, a homomorphic encrypted message having a mantissa value of 1.13 and an exponential value of 2 may be used to generate a homomorphic encrypted message having a mantissa value of 11.3 and an exponential value of 1.

Meanwhile, multiplication and division in floating point can be easily processed by calculation between exponents and calculation between mantissas, and even the floating-point type homomorphic encrypted message can be easily calculated through calculation between encrypted messages of exponent and calculation between encrypted messages of mantissa in the same way.

However, in case of the addition and subtraction in the floating point, a prior operation of matching exponents is required even in the plain text state, so the operation of matching the exponents as described above is required in advance even in the floating-point type homomorphic encrypted message.

Accordingly, when the homomorphic operations such as the addition and subtraction are required, the processor 450 may preferentially perform a process of unifying the positions of the floating points of two homomorphic encrypted messages. For example, when the exponential value is not encrypted, the processor 450 may match the exponential values of the two homomorphic encrypted messages by applying a value corresponding to the difference between the exponential values to a specific homomorphic encrypted message.

Meanwhile, when the exponential value is encrypted and the addition and subtraction calculations are performed on the two homomorphic encrypted messages, the processor 450 may convert the two homomorphic encrypted messages into floating-point type data, that is, may perform the homomorphic operation between a plurality of data by performing a homomorphic operation of multiplying encrypted mantissa data by $10^{\wedge}$ exponential data.

Alternatively, the processor 450 may perform a prior operation of calculating exponent correction data to be applied to each homomorphic encrypted message and applying the calculated exponential correction data to each homomorphic encrypted message, and then may also perform the homomorphic addition or homomorphic subtraction. These operations will be described later with reference to FIGS. 7 to 10.

Meanwhile, when the calculation is completed, the arithmetic unit 400 may detect data in an effective area from calculation result data. Specifically, the arithmetic unit 400 may detect the data in the effective area by performing rounding processing on the calculation result data. The rounding processing means rounding-off a message in an encrypted state, and may also be referred to as rescaling. Specifically, the arithmetic unit 400 removes a noise region by multiplying each component of the encrypted message by $\Delta^{-1}$ which is the reciprocal of the scaling factor, and rounding-off each component of the encrypted message. The noise area may be determined to correspond to the size of the scaling factor. As a result, it is possible to detect a message in the effective area from which the noise area is excluded. Since it proceeds in an encrypted state, an additional error occurs, but the size is small enough to be ignored.

As described above, the arithmetic unit 400 according to one or more embodiments of the disclosure distinguishes the exponent and mantissa in the floating point type for the numerical data and encrypts the exponent and mantissa, and in the calculation process or the above-described rebooting process, it is possible to prevent the precision of data from being changed.

Figure 3:
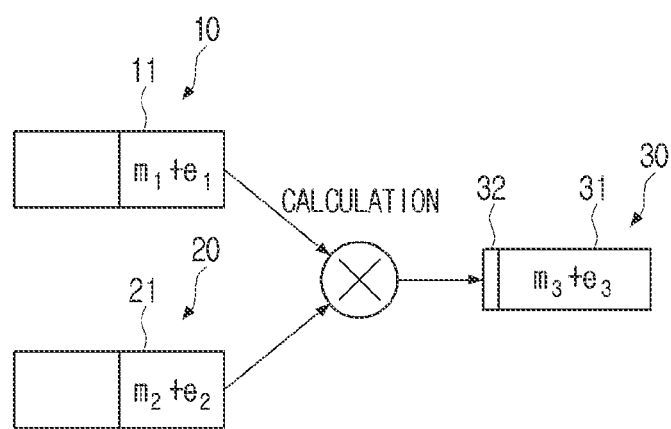
FIG. 3 is a diagram for describing a calculation operation for a homomorphic encrypted message.

FIG. 3 is a diagram for describing a calculation operation for a homomorphic encrypted message. Specifically, FIG. 3 illustrates calculation of two homomorphic encrypted messages 10 and 20.

Each homomorphic encrypted message 10 and 20 may include approximate message areas 11 and 21, respectively. The approximate message areas 11 and 21 include messages and errors m1+e1 and m2+e2 together.

First, it is assumed that two homomorphic encrypted messages store data in a fixed-point type.

Since the two homomorphic encrypted messages are the fixed-point type, the arithmetic unit 400 may perform the addition calculation only by the homomorphic addition of the two encrypted messages. Also, for the multiplication calculation, the multiplication calculation may be performed only by performing the homomorphic multiplication for the homomorphic encrypted message.

In this way, the fixed-point type has the advantage of simple processing in the calculation. However, when the range of values to be used is wide, there are the following problems. In the following, for ease of explanation, it is assumed that 30-bit precision is supported for the homomorphic encrypted message and that two slots (slot[0], slot[1]) contain values of $2^{20}$ and 1, respectively.

When the floating-point type (or ideal type) satisfies the precision of 30, slot[0] (1010) guarantees 30 digits by adding 20 digits above the decimal point and 10 digits below the decimal point, and slot [1] (1020) guarantees 30 digits below the decimal point.

However, the 30-bit precision in the fixed-point type means that digits are counted from the highest digit, and that is preserved as a whole. Therefore, slot [0] is guaranteed to have 30 digits with 20 digits above the decimal point and 10 digits below the decimal point like the above-described floating point type. However, slot[1] should have the same number of digits as slot[0], and therefore, has 20 digits above the decimal point and 10 digits below the decimal point. In this way, for slot [1], in the fixed point type, only digits below the decimal point are guaranteed, so the actual precision for the corresponding slot is 10 bits.

In particular, in case of the homomorphic encrypted message according to the disclosure, an error less than the above-described precision is added to the encrypted message in the encryption process. When the precision was reduced, the number of times of calculations for the homomorphic encrypted messages may be bound to be limited.

To solve this problem, in the disclosure, the encrypted message is generated for numerical data in the floating-point type. Meanwhile, in case of the floating point, all may have the same precision regardless of the range of data as described above.

However, when data is stored in the floating-point type, it is difficult to calculate the addition and subtraction. Specifically, in order to perform the addition and subtraction in the floating-point type, an operation of checking the exponential values of the two values and matching the exponential sizes of the two data needs to be preferentially operated. For example, when performing an addition calculation for 11 and 1.3, two values may be expressed as $1.1*10^1$ in floating-point type (mantissa value of 1.1, exponential value of 1) and $1.3*10^0$ (mantissa value of 1.3, exponential value of 0), and the calculation between the mantissa values is possible only when the exponential value is unified to 1, such as $1.1*10^1+0.13*10^1$, or the mantissa value is unified to 0, such as $11*10^0+1.3*10^0$.

In the plain text state, the exponential difference between the two data may be easily checked as described above, so the above-described calculation may be easily performed. However, when the exponential data is encrypted, difficulties may arise in the calculation such as the addition and subtraction.

Therefore, in order to easily check the exponential difference, it is also possible to encrypt only the mantissa data and not encrypt the exponential value. This method will be described later with reference to FIG. 4. Meanwhile, in case of using the exponential value as it is, in order to prevent the size of the value from being leaked, it is also possible to randomize and encrypt the range of the mantissa to have a range different from that of a general floating point range. This will be described below with reference to FIG. 5.

Meanwhile, since the homomorphic encrypted messages support four arithmetic operations in the encrypted message state, even if the exponential data is encrypted, it is possible to calculate how to match the exponential sizes through the calculation of the exponential values. The method will be described later with reference to FIGS. 7 to 10.

However, compared to the addition and subtraction operations in the fixed-point type, since the addition and subtraction operations in the floating-point type require more resources in the calculation process, the arithmetic unit may selectively perform an operation of encrypting both the exponential value and the mantissa value, encrypting only the mantissa value, or encrypting the fixed-point type in consideration of the weight of the addition and subtraction calculations in the calculation process, the required precision for the numerical data, the required security level, etc.

Figure 4:
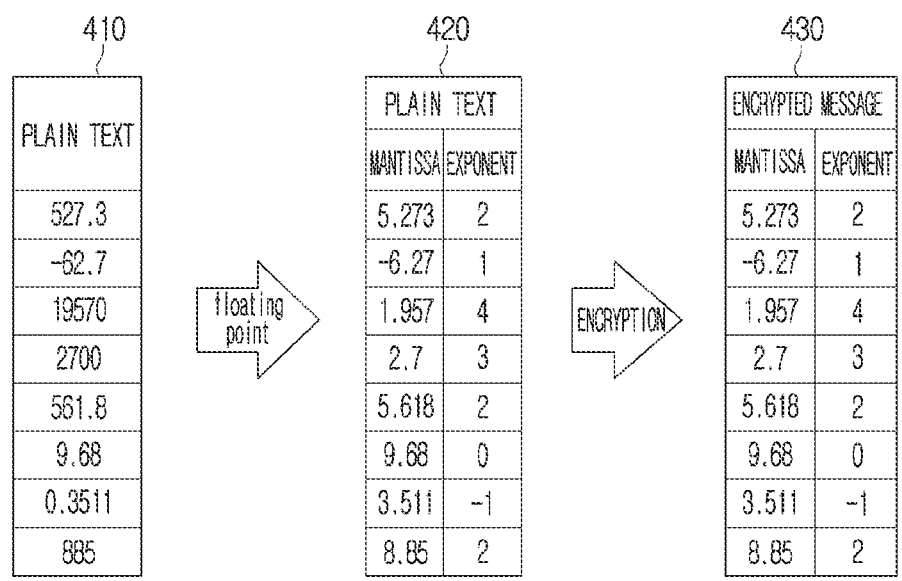
FIG. 4 is a diagram for describing a method of generating a homomorphic encrypted message for real data according to a first embodiment of the disclosure.

FIG. 4 is a diagram for describing a method of generating a homomorphic encrypted message for real data according to a first embodiment of the disclosure.

The homomorphic encrypted message may have a plurality of slots, and it is possible to store different data in each slot. In this respect, in FIG. 4, the case in which one homomorphic encrypted message performs homomorphic encryption on eight numerical data will be assumed and described. Meanwhile, it is also possible to generate eight numerical data as individual homomorphic encrypted messages in implementation. In the following, in order to facilitate explanation, the mantissa and exponent in the encrypted message state are also expressed as plain text values, but data values other than items expressed as the plain text display plain text values only for understanding, and the actual data has encrypted data.

Referring to FIG. 4, eight numerical data 410 are expressed in the fixed-point type. First, the numerical expression method 420 may be changed to the floating-point type. Accordingly, it may be checked that a value of 527.3 is expressed as a mantissa of 5.273 and an exponent of 2.

In this way, when the exponential value and the mantissa value of each numerical data are checked, the homomorphic encryption is performed on the mantissa value, and the encrypted mantissa value and exponential value may be stored in a slot of one homomorphic encrypted message 430. Meanwhile, the homomorphic encrypted message may be expressed in the form of a complex number. The above-described encrypted mantissa value is put into the real area of the complex number, and the above-described exponential value is put into the imaginary area of the complex number, so the mantissa value and the exponential value may be stored separately in the form of one complex number. When the exponential value and the mantissa value are stored separately, the size of the encrypted message is doubled compared to the previous one, but in case of putting the mantissa part into the real part of the complex number and the exponent part into the imaginary part of the encrypted message in consideration of the support method of complex number calculation in the homomorphic encrypted message, the encrypted message of the same size as the existing one may be generated.

Meanwhile, it is also possible to perform the encryption on the exponential value in implementation, and store the encrypted mantissa value and the encrypted exponential value in a slot of one homomorphic encrypted message.

Meanwhile, although the mantissa value is shown as having a negative value in FIG. 4, it is also possible to classify numerical data into a mantissa value, an exponential value, and three signs in implementation. In that case, it is also possible to store a sign as separate information.

Meanwhile, in the above, it has been described that the mantissa value is fixed within a section of length A like [0, A] or [−A/2, A/2] as in the general floating-point type, and the exponential values and the mantissa values are used in the form having a unique exponent z. However, since the data is not very large or very small in the homomorphic encrypted message, there is no need to limit the range of the mantissa and find a unique exponent z. A case in which this example is reflected will be described with reference to FIG. 5.

Figure 5:
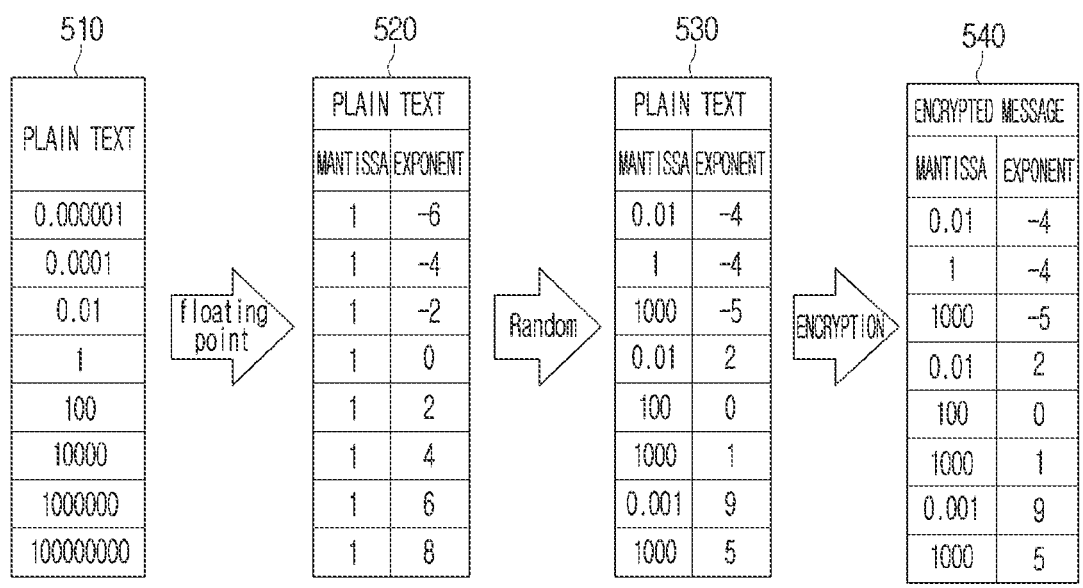
FIG. 5 is a diagram for describing a method of generating a homomorphic encrypted message for real data according to a second embodiment of the disclosure.

FIG. 5 is a diagram for describing a method of generating a homomorphic encrypted message for real data according to a second embodiment of the disclosure.

Referring to FIG. 5, a method of randomizing and using an exponent size is shown. When numerical data 510 is expressed in a general floating-point type, it is the same as a plain text 520. However, as described above, the reason for using the floating-point type for the homomorphic encrypted message is to prevent the precision from being significantly limited, so the range of the mantissa does not need to be limited like $[-A/2, A/2]$.

Therefore, by applying randomization to the exponential value, the exponential value may be changed in the range of −3 to 3, for example, and the mantissa value corresponding thereto may be used. In this case, a range optimized according to an experiment may be used for the range to be randomized. After the exponential value is randomized, the encryption operation is the same as the operation described in FIG. 4, and therefore, a redundant description thereof will be omitted.

Figure 6:
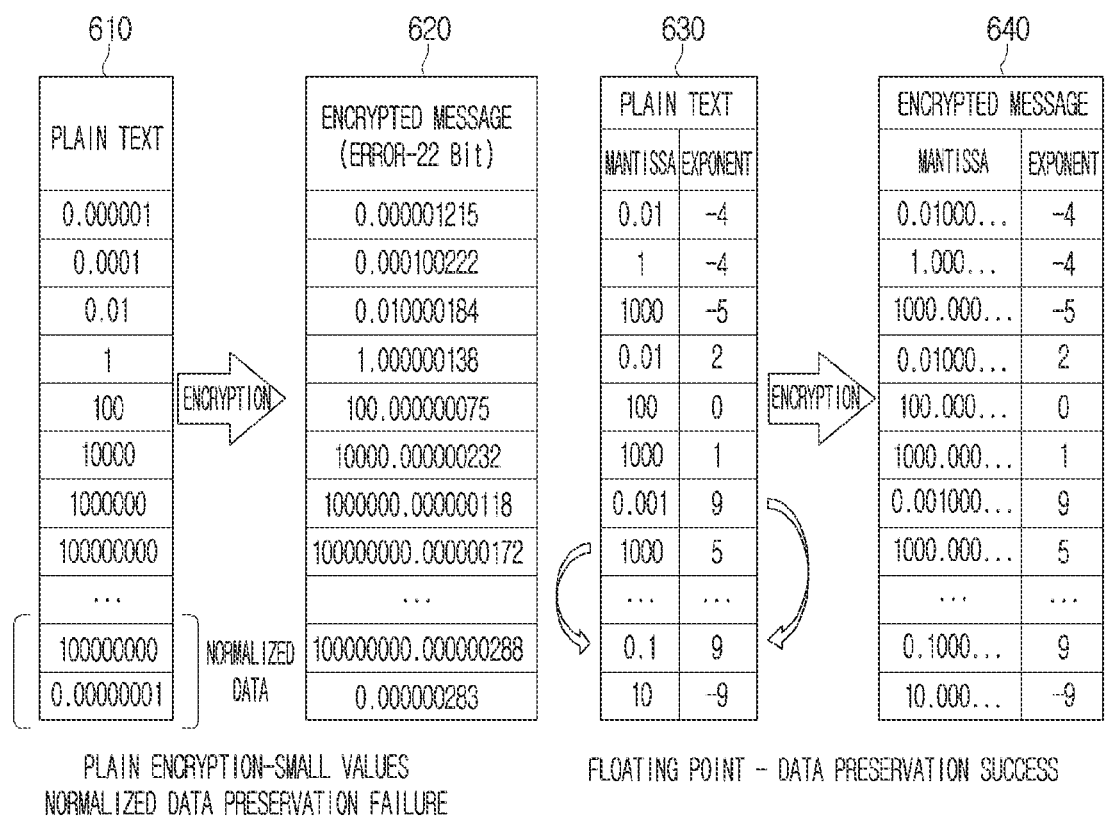
FIG. 6 is a diagram for describing a difference between the conventional method and the homomorphic encrypted message according to the present embodiment.

FIG. 6 is a diagram for describing a difference between the conventional method and the homomorphic encrypted message according to the present embodiment.

The homomorphic encrypted messages support polynomial calculations, but it is possible to perform non-polynomial calculations by using approximation polynomials for non-polynomial calculations (e.g., comparison calculations).

Since the range of values to be used should be known to use this approximation polynomial, the largest value of the value used and the reciprocal of the largest value are stored together in the homomorphic encrypted message. Specifically, since general approximation polynomials operate in the range of $[-1, 1]$, in order to use the approximation polynomial, through the operation of multiplying the encrypted message by the reciprocal of the large value described above, the values of the homomorphic encrypted message may be within the range of $[-1, 1]$ described above. Also, when restoring to the range of original values after the end of the calculation, the largest value is multiplied by the calculation result, so the larger value and its reciprocal are stored together.

In order to use the approximation polynomial in this way, a process of changing the numerical range is required, and when the difference between the large value and the small value is large in that the largest value is used in the process of changing the numerical range, the small value is not guaranteed by error.

Meanwhile, when values are stored in the floating-point type, as illustrated, since the precision of each value is the same, it may be checked that the precision of each data is maintained even in the process of changing the value.

Hereinafter, when the encrypted message is generated in the floating-point type in the above-described method, a calculation method of the corresponding encrypted message will be described.

It is possible to perform the four arithmetic operations for the homomorphic encrypted messages while maintaining the floating-point type.

Meanwhile, if necessary, it is also possible to perform the four arithmetic operations after changing the floating-point type data to the fixed-point type. That is, the floating-point type data can be easily changed to the fixed-point type by performing the homomorphic operation in the form of $A*10^B$ for data having a mantissa value A and an exponential value B.

The multiplication calculation may be performed by multiplying mantissas and adding exponents between a plurality of homomorphic encrypted messages. For example, when performing multiplication calculation for encrypted message 1 (mantissa value A, exponential value B) and encrypted message 2 (mantissa value C, exponential value D), calculation may be performed with encrypted message 3 (mantissa value A*B, exponential value C+D).

Meanwhile, when the mantissa value is equal to or greater than a certain value by the above-described calculation, for example, when the mantissa value is greater than or equal to 10, additional calculation, which performs an operation of dividing the mantissa value by 10 for the above-described encrypted message 3 and adding 1 to the exponential value, may be performed. However, this operation is performed only when high precision is required, and may be omitted in general cases.

When performing statistical calculation for multiple data, statistical calculation is possible only when the exponent of each numerical data is the same. In this case, the calculation may be performed after correcting the data to fit the largest exponent.

Specifically, as described above, in homomorphic encrypted message, the largest value and its reciprocal are stored as data for normalization. Each value is modified to have the corresponding exponential value based on the exponential value of the data for the normalization, and then the statistical calculations may be performed. For example, in case of FIG. 6, since the exponent of the normalized data is 9, the above-described statistical calculation may be performed after modifying all data to have an exponential value of 9. Meanwhile, when the exponential value is encrypted, the difference values between the encrypted exponential value of the normalized data and the exponential values of each value are calculated, and the exponential values may be matched using the calculated value. For example, in case of first numerical data 640 (mantissa 0.01 (A), exponent −4 (B)) of the encrypted message in FIG. 6 and exponential value (C) of the normalized data, the exponents between each data may be matched through calculations such as $(A*10^{(C-B)}, C)$.

Hereinafter, the method of calculating addition and subtraction for two homomorphic encrypted messages in the floating-point type will be described.

Figure 7:
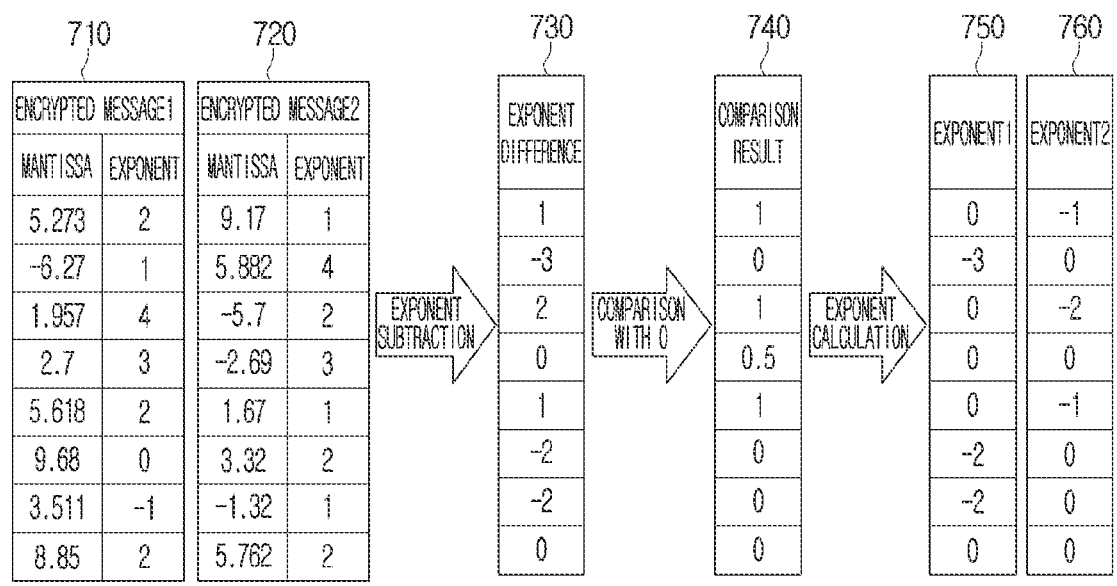
FIG. 7 is a diagram for describing a first calculation operation of a homomorphic encrypted message generated according to the disclosure.

FIG. 7 is a diagram for describing a first calculation operation of a homomorphic encrypted message generated according to the disclosure.

First, in order to perform the addition and subtraction calculations on the floating-point type data, the exponential values of the two data should be matched. In addition, in order to match these exponential values, since it is necessary to know the difference between the exponential values of the two data, in FIG. 7, the exponential difference between the two data is calculated.

Specifically, referring to FIG. 7, when homomorphic addition or subtraction is performed on two homomorphic encrypted messages 710 and 720, homomorphic subtraction of exponential values between the two encrypted messages is performed. As a result, an exponential difference value 730 between the two data is calculated.

When such a value is calculated, it is possible to check whether the calculated value is a positive value, a negative value, or the same through a comparison calculation with 0 (740). The comparison calculator used here used a homomorphic comparator that calculates a value of 1 if it exceeds 0, calculates a value of 0 if it is less than 0, and calculates a value of 0.5 if it is 0. Meanwhile, in implementation, it is also possible to use a comparator that calculates a different value in addition to the comparator described above.

The exponential value to be applied to each encrypted message is calculated using a calculation result 740 of the comparator (750, 760). Specifically, the illustrated exponent 1 750 is an exponential value to be applied to encrypted message 1, and the exponent 2 760 is an exponential value to be applied to encrypted message 2. For example, in case of the first slot, since the exponential value of encrypted message 1 is greater, as a result of the comparison, 1 is calculated, and the first slot of the exponent 1 750 calculates That is, a separate exponential conversion is not performed on the first encrypted message. On the other hand, the first slot of exponent 2 760 has a value of −1, which means that exponential conversion is required for encrypted message 2 to correspond to encrypted message 1.

Operations after exponent 1 and exponent 2 are calculated in this way will be described below with reference to FIG. 8.

Figure 8:
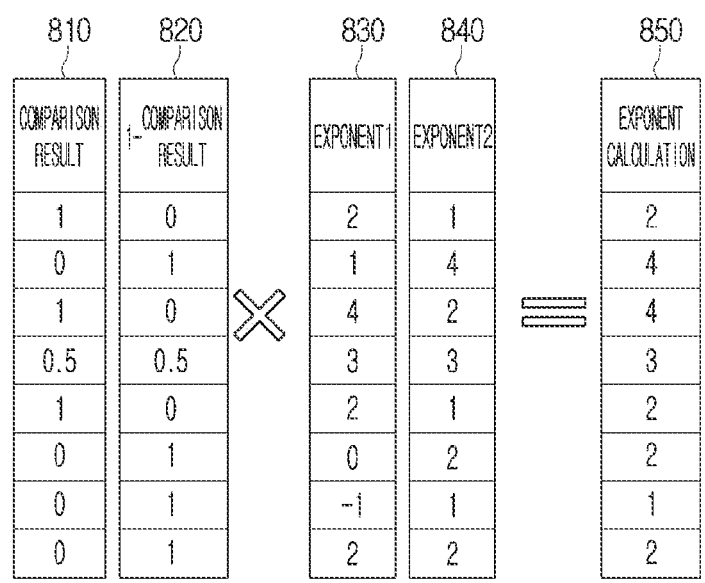
FIG. 8 is a diagram for describing a second calculation operation of a homomorphic encrypted message generated according to the disclosure.

FIG. 8 is a diagram for describing a second calculation operation of a homomorphic encrypted message generated according to the disclosure. Specifically, FIG. 8 is an operation of calculating an exponential value of a final calculation result of homomorphic addition or homomorphic subtraction.

Referring to FIG. 8, the above-described comparison result 810 and a reciprocal value 820 for the comparison result are calculated, and the result of multiplying a comparison result 810 by exponent 1 830 and the result of multiplying a comparison result 820 by exponent 2 840 may be added to calculate a final exponential value 850.

In the illustrated example, each value of the encrypted message is expressed in the plain text state, but it is not known what values the mantissa and exponential values are in the actual encrypted message state. In addition, the calculation results, such as the exponential difference, the comparison result, the exponent 1, and the exponent 2, calculated in the middle are displayed as the values of the plain text stat for easy understanding, but actually encrypted values are calculated.

Hereinafter, an operation of calculating a final mantissa value will be described with reference to FIG. 9.

Figure 9:
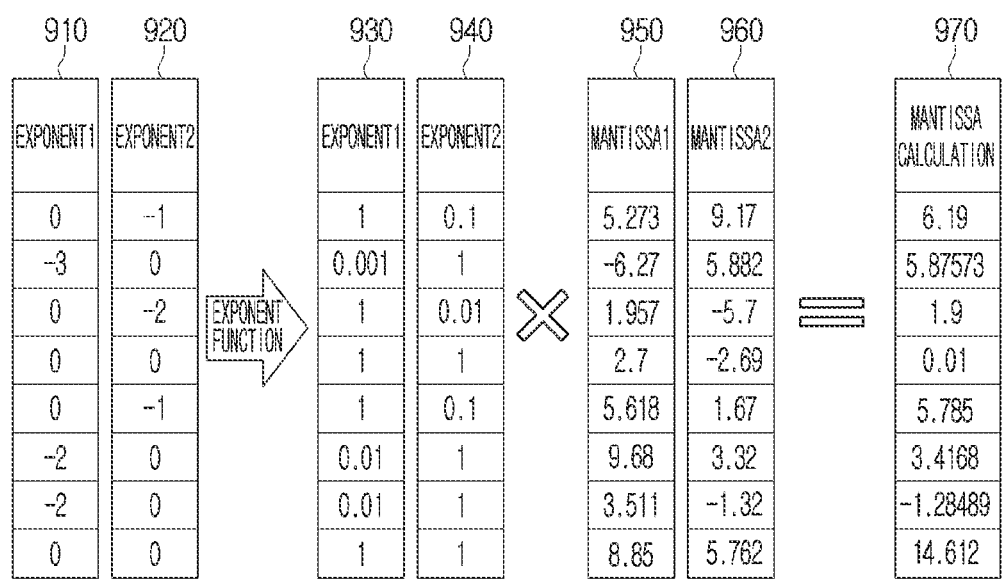
FIG. 9 is a diagram for describing a second calculation operation of a homomorphic encrypted message generated according to the disclosure.

FIG. 9 is a diagram for describing a second calculation operation of a homomorphic encrypted message generated according to the disclosure.

Referring to FIG. 9, exponent 1 750 and 910 and exponent 2 760 and 920 of FIG. 7 for correction previously calculated are calculated as exponential values 930 and 940 using an exponential function.

In addition, the calculated exponential values 930 and 940 and the mantissa values 950 and 960 in the encrypted message are multiplied by the corresponding values, and the corresponding calculation result may be added or subtracted to calculate a final mantissa value. That is, exponent 1*mantissa 1+exponent 2*mantissa 2=mantissa calculation.

Figure 10:
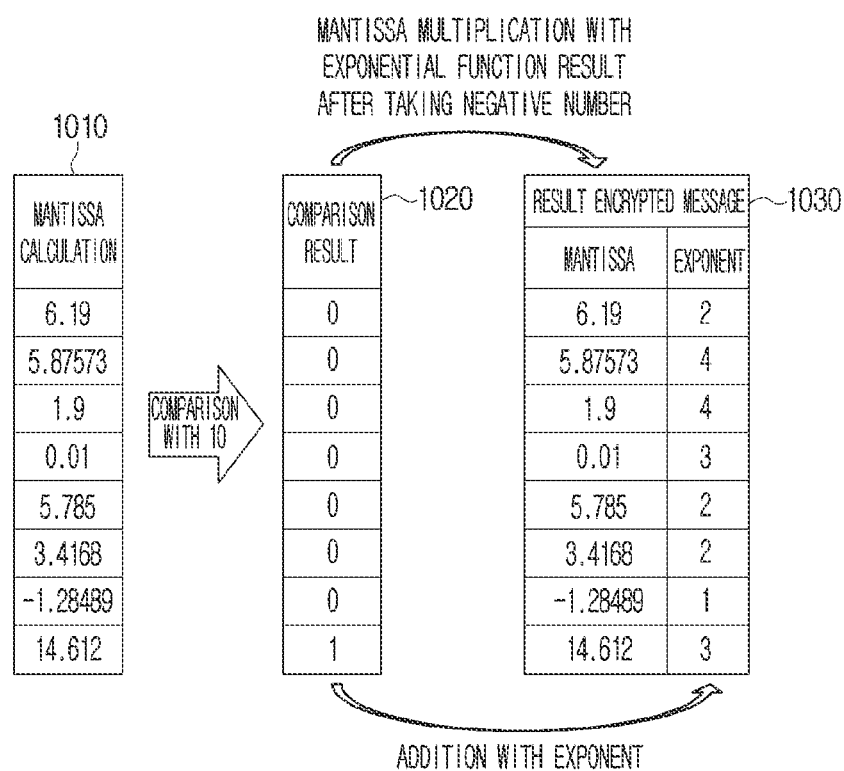
FIG. 10 is a diagram for describing a second calculation operation of a homomorphic encrypted message generated according to the disclosure.

FIG. 10 is a diagram for describing a third calculation operation of a homomorphic encrypted message generated according to the disclosure.

When the exponential value of the calculation result is calculated in FIG. 8 and the mantissa value of the calculation result is calculated in FIG. 9, the final calculation result encrypted message may be generated using the two values as in the process of generating the homomorphic encrypted message.

In this case, each calculated mantissa value is compared with 10, that is, it is checked whether the number of digits of the exponential value needs to be changed, and when the number of digits of the exponential value needs to be changed, a final result encrypted message 1030 may be generated by reflecting this.

Figure 11:
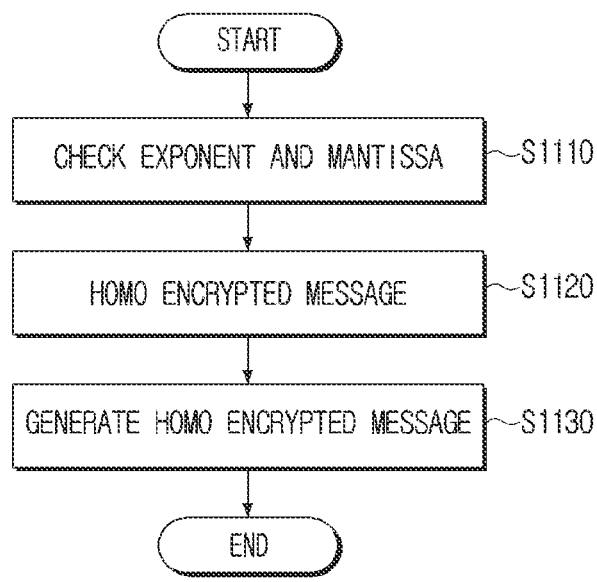
FIG. 11 is a flowchart for describing a method of generating a homomorphic encrypted message according to one or more embodiments of the disclosure.

FIG. 11 is a flowchart for describing a method of generating a homomorphic encrypted message according to one or more embodiments of the disclosure.

Referring to FIG. 11, first, the exponential data and the mantissa data of the numerical data are checked (S1110). Specifically, the exponential value and the mantissa value of the numerical data may be checked. In this case, the exponential value and the mantissa value of the numerical data may be calculated in a general manner, and if necessary, the exponential value and the mantissa value of the numerical data may be calculated based on the predetermined exponential value. For example, it is also possible to calculate the exponential value and the mantissa value so that the mantissa value has a value outside the range of [0.1 to 9].

Then, the mantissa data is homomorphically encrypted (S1120). Specifically, the encryption of the mantissa value may be performed by reflecting the public key on the previously identified mantissa value. In implementation, the homomorphic encryption may be performed even on the exponential data.

The encrypted mantissa data and exponential data are merged to generate the homomorphic encrypted message (S1130). When the homomorphic encryption is performed on the exponential data, the homomorphic encrypted message may be generated by arranging the encrypted mantissa data in the real area of the complex number and arranging the encrypted exponential data in the imaginary area.

Figure 12:
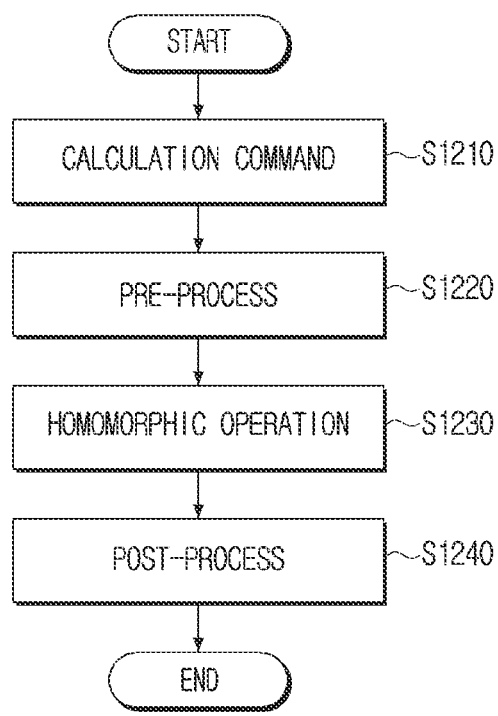
FIG. 12 is a flowchart for describing a method of processing a homomorphic encrypted message according to one or more embodiments of the disclosure.

FIG. 12 is a flowchart for describing a method of processing a homomorphic encrypted message according to one or more embodiments of the disclosure.

Referring to FIG. 12, when a calculation command for a plurality of homomorphic encrypted messages is input (S1210), it is possible to determine whether pre-processing is necessary by analyzing the input calculation command. For example, when the statistical calculation or the homomorphic addition or homomorphic subtraction calculation is included, pre-processing of matching exponents between each encrypted message or processing of converting each encrypted message to a fixed-point type may be performed.

The calculation between the homomorphic encrypted messages is performed (S1230). The four arithmetic operation methods for specific homomorphic encrypted messages have been described above, and therefore, a redundant description thereof will be omitted.

The post-processing is performed on the calculation result (S1240). Specifically, when the mantissa value of the calculation result exceeds a predetermined value (e.g., 10), the corresponding mantissa value is adjusted to be within the predetermined value, and, conversely, an operation of adding or subtracting the corresponding value to and from the exponential value may be performed.

Meanwhile, when the data value is changed to the fixed-point type due to the previous pre-processing operation, an operation of converting the calculation result back to the floating-point type may be performed. For example, by using the exponential value for the maximum value used for the normalized data, the exponential value may be regarded as the exponential value of the calculation result, and the mantissa value may be calculated and converted into the floating-point type. Alternatively, by using only the method of calculating the exponential value of the calculation result as described in FIGS. 7 and 8 above, that is, the exponential calculation is calculated in the same way as in FIGS. 7 and 8, but the mantissa calculation is converted to the fixed-point type. After performing this, a method of calculating a mantissa value using the previously calculated exponential value and fixed-point type value may be used.

As such, since the method of processing an encrypted message according to the disclosure stores the homomorphic encrypted message in the floating-point type, it is possible to prevent variations in precision in a calculation process. In addition, even when using the floating-point type, it is possible to use the same calculation as before.

Meanwhile, the above-described encrypted message processing method according to various embodiments may be implemented in the form of program code for performing each step, and stored and distributed in a recording medium. In this case, the device equipped with the recording medium may perform operations such as the above-described encryption or encrypted message processing.

Such a recording medium may be various types of computer readable media such as ROM, RAM, memory chip, memory card, external hard, hard, CD, DVD, magnetic disk, or magnetic tape.

Although the disclosure has been described with reference to the accompanying drawings, the scope of the disclosure is determined by the claims to be described below and should not be construed as being limited to the foregoing embodiments and/or drawings. In addition, it should be clearly understood that improvements, changes and modifications obvious to those skilled in the art of the disclosure described in the claims are also included in the scope of the disclosure.

What is claimed is:

1. A method of processing an encrypted message in an arithmetic unit, the method comprising:
   checking exponential data and mantissa data for numerical data;
   performing homomorphic encryption on the mantissa data;
   performing homomorphic encryption on the exponential data; and
   merging the encrypted mantissa data and the encrypted exponential data to generate a homomorphic encrypted message.

2. The method as claimed in claim 1, wherein in the checking, an exponential value and a mantissa value of the numerical data are calculated based on a predetermined exponential value, and
   in the performing of the homomorphic encryption, the mantissa value is homomorphically encrypted.

3. The method as claimed in claim 1, wherein, in the generating of the homomorphic encrypted message, the homomorphic encrypted message is generated by arranging the encrypted mantissa data in a real area of the homomorphic encrypted message and arranging the encrypted exponential data in an imaginary area of the homomorphic encrypted message.

4. The method as claimed in claim 1, further comprising:
   generating a homomorphic encrypted message in a fixed-point data type using the encrypted mantissa data and exponential data in the homomorphic encrypted message.

5. The method as claimed in claim 1, further comprising:
   generating a second homomorphic encrypted message having the same plain text numerical value as the homomorphic encrypted message and having an exponent of a different value.

6. A method of processing an encrypted message in an arithmetic unit, the method comprising:
   checking exponential data and mantissa data for numerical data;
   performing homomorphic encryption on the mantissa data; and
   merging the encrypted mantissa data and the encrypted exponential data to generate a homomorphic encrypted message,
   further comprising:
   performing calculation between a plurality of homomorphic encrypted messages;
   wherein, in the performing of the calculation, an exponential value of at least one of the plurality of homomorphic encrypted messages is scaled so that the plurality of homomorphic encrypted messages have the same exponential value, and calculation is performed between the homomorphic encrypted messages having the same exponential value.

7. An arithmetic unit, comprising:
   a memory configured to store numerical data; and
   a processor configured to generate a homomorphic encrypted message for the numerical data,
   wherein the processor checks exponential data and mantissa data for numerical data, homomorphically encrypts the checked mantissa data, homomorphically encrypts the exponential data, and merges the encrypted mantissa data and the encrypted exponential data to generate the homomorphic encrypted message.

8. The arithmetic unit as claimed in claim 7, wherein the processor calculates the exponent value and mantissa value of the numerical data based on a predetermined exponent value, and homomorphically encrypts the mantissa value.

9. The arithmetic unit as claimed in claim 7, wherein the processor arranges the encrypted mantissa data in a real area of the homomorphic encrypted message and arranges the encrypted exponential data in an imaginary area of the homomorphic encrypted message to generate the homomorphic encrypted message.

10. The arithmetic unit as claimed in claim 7, wherein the processor generates a homomorphic encrypted message in a fixed-point data type using the encrypted mantissa data and exponential data in the homomorphic encrypted message.

11. The arithmetic unit as claimed in claim 7, wherein the processor generates a second homomorphic encrypted message having the same plain text numerical value as the homomorphic encrypted message and having an exponent of a different value.

12. An arithmetic unit, comprising:
   a memory configured to store numerical data; and
   a processor configured to generate a homomorphic encrypted message for the numerical data,
   wherein the processor checks exponential data and mantissa data for numerical data, homomorphically encrypts the checked mantissa data, and merges the encrypted mantissa data and the exponential data to generate the homomorphic encrypted message,
   wherein, when an calculation command between a plurality of homomorphic encrypted messages is requested, the processor scales an exponential value of at least one of the plurality of homomorphic encrypted messages so that the plurality of homomorphic encrypted messages have the same exponential value, and performs calculation between the homomorphic encrypted messages having the same exponential value.

* * * * *